United States Patent [19]

Cherendin et al.

[11] Patent Number: 4,819,917

[45] Date of Patent: Apr. 11, 1989

[54] APPARATUS FOR DEBURRING WORKPIECES BY GAS DETONATION

[75] Inventors: Alexandr F. Cherendin; Oleg I. Stoyanovsky; Lev N. Shepelev; Vladislav V. Mitrofanov; Viktor I. Manzhalei, all of Novosibirsk; Abram D. Tsemakhovich; Georgy P. Moskvitin, both of Barnaul; Valery G. Galutsky, Novosibirsk, all of U.S.S.R.

[73] Assignee: Spetsialnoe Konstruktorskoe Bjuro Gidroimpulsnoi Techniki Sibirskogo Otdeleniva Akademii Nauk SSSR, Novosibkrsk, U.S.S.R.

[21] Appl. No.: 183,150

[22] PCT Filed: Jun. 20, 1986

[86] PCT No.: PCT/SU86/00066

§ 371 Date: Feb. 17, 1988

§ 102(e) Date: Feb. 17, 1988

[87] PCT Pub. No.: WO87/07861

PCT Pub. Date: Dec. 30, 1987

[51] Int. Cl.[4] .............................................. B23K 7/00
[52] U.S. Cl. .................................... 266/51; 266/249;
266/251; 266/252; 266/261
[58] Field of Search ................... 266/48, 51, 249, 250,
266/251, 252, 261; 148/9, 9.5

[56] References Cited

U.S. PATENT DOCUMENTS

| Re. 29,408 | 9/1977 | Geen et al. | 148/9 R |
|---|---|---|---|
| 1,186,162 | 6/1916 | Bauer | 148/9 R |
| 1,195,403 | 8/1916 | Schaap | 148/9 R |
| 3,645,521 | 2/1972 | Geen et al. | 266/249 |
| 3,666,252 | 5/1972 | Rice | 266/249 |
| 3,901,488 | 8/1975 | Riddle | 266/249 |
| 4,162,391 | 7/1979 | Sciaky | 219/121 EB |
| 4,394,007 | 7/1983 | Leisner | 148/9 R |
| 4,405,382 | 9/1983 | Baier et al. | 148/9 R |

*Primary Examiner*—Wayland Stallard
*Attorney, Agent, or Firm*—Lilling & Greenspan

[57] ABSTRACT

An apparatus for deburring workpieces by gas detonation comprises a bed (1) having mounted thereon a casing (2) open at one end (4), and an indexing table (6) with bottoms (7) arranged alternately in front of the open end (4) of the casing (2). There is also provided a drive (9) for moving the bottom (7) toward the open end (4) of the casing (2) to form during their connection a gas detonation chamber (10), and a system (13) for feeding gases thereto for forming an explosive mixture with a spark plug (15). Connection of the casing (2) to the bottom (7) is done by a bayonet joint (16) one element of which is kinematically linked with a drive (17) for turning it relative to the other element.

8 Claims, 3 Drawing Sheets

APPARATUS FOR DEBURRING WORKPIECES BY GAS DETONATION

FIELD OF THE INVENTION

This invention relates to mechanical engineering, and more particularly to an apparatus for removing burrs from workpieces by gas detonation.

BACKGROUND OF THE INVENTION

There is known an apparatus for deburring workpieces by gas detonation (cf., U.S. Pat. No. 3,666,252, Int. Cl. C 21 D 1/82) comprising a bed the upper part of which accommodates a casing with a cavity open at one, particularly lower end. Mounted on the bed is an indexing table on which there are disposed equidistantly about the periphery replaceable bottoms arranged alternately opposite to the open end of the casing.

Secured under the casing on the bed is a drive for imparting reciprocating movement to each successive bottom in a direction to the casing and therefrom. The drive has the form of a toggle driven by a hydraulic power cylinder and kinematically linked with a pusher extending through hole in the indexing table provided under each replaceable bottom. The pusher is intended to lift the bottom from the indexing table, move the bottom and force it to the open end of the casing.

As the casing is connected to one of the bottoms, a gas detonation chamber is formed intended to accommodate therein workpieces having burrs to be removed especially in hard-to-reach locations by gas detonation, that is by explosion of a gas mixture. The force developed by the hydraulic power cylinder is sufficient to hold the gas detonation chamber sealed at the point of gas detonation.

Each bottom has at its top a sealing element serving to hermetize the interior of the gas detonation chamber at the point where the bottom is connected to the casing.

For feeding a combustible gas and oxygen to the gas detonation chamber to form an explosive mixture there is provided a gas feeding system, whereas a spark plug is envisaged for igniting the gas mixture.

In this prior art apparatus the bed and toggle operate under heavy static loads as the bottom is connected to the casing, that is when the gas detonation chamber is closed and sealed, and as high dynamic loads are developed following a sudden increase in pressure in the chamber during gas detonation, viz., during explosion of the mixture.

A specific feature of the process of explosion taking place in the gas detonation chamber is such that in the case of depressurization of this chamber at the point of explosion (the pressure accompanying the explosion being intended to open the gas detonation chamber, viz., to force the bottom away from the casing) hot products of explosion can escape, whereby the elements of the gas detonation chamber tend to fuse resulting in burning and failure. Therefore, highly reliable sealing of the gas detonation chamber during gas detonation in such apparatus is essential.

Further, in this known apparatus the force connecting the casing to the bottom is controlled by varying resilient displacements of the bed as the gas detonation chamber is closed. Since the bed is subjected to substantial loads, it has to posess a sufficiently high rigidity and therefore be quite bulky, whereby during closing of the gas detonation chamber the bed is subject to small resilient displacements which are virtually impossible to measure.

When closing the gas detonation chamber, the levers of the toggle are set along a straight line to prevent gas detonation from acting on the hydraulic power cylinder. However, during operation the friction parts of the toggle tend to wear to result in play, which is practically impossible to eliminate, because the levers are in one line. Therefore, the magnitude of minor resilient displacement of the bed must be constantly controlled, and when necessary, thorough adjustment of the closing force must be done, which necessitates the services of highly qualified adjusters.

For removing burrs from workpieces of larger size, it is necessary to increase the dimensions of the gas detonation chamber. This in turn leads to higher loads exerted on the toggle and, accordingly, on the bed to necessitate their higher rigidity, greater weight, and higher powder of the hydraulic power drive ensuring closing or sealing of the gas detonation chamber.

SUMMARY OF THE INVENTION

The present invention aims at providing an apparatus for deburring workpieces by gas detonation, in which connection of the casing to the bottom with the view of forming a gas detonation chamber would be done so as to reduce dynamic loads resulting from gas detonation exerted on the bed.

The aim of the invention is attained by that in an apparatus for deburring workpieces by gas detonation comprising a bed having mounted thereon a casing with a cavity open at one end of the casing, an indexing table with bottoms arranged alternately opposite to the open end of the casing, a drive for reciprocating a successive bottom toward the open end of the casing to form during their connection a gas detonation chamber, a seal between the casing and bottom, and a system for feeding gases to the gas detonation chamber to form an explosive mixture with a spark plug to ignite the explosive mixture, according to the invention, the casing is connected to the bottom by a bayonet joint, one element of which is kinematically linked with a drive to turn it relative to the other element thereof.

The use of a bayonet joint for connecting the bottom to the casing makes it possible to dispense with a bulky toggle and substantially reduce loads exerted on the bed due to gas detonation, that is explosion of the gas mixture in the gas detonation chamber, since with such a connection of the bottom to the casing forces arising due to explosion of the gas mixture form a closed power circuit at the walls of the gas detonation chamber.

Releaving the bed of loads during explosion enables to reduce severalfold the rigidity and mass of the bed. The bed in this case only serves to hold elements of the apparatus.

When it is necessary to remove burrs from workpieces of larger size, it is preferable to increase the diameter of the cavities of the gas detonation chamber and ensure the strength of both the walls of this chamber and the elements of the bayonet joint.

Advisably, the casing is provided with a jacket surrounding at least part of the outer side surface of the casing extending beyond the open end of the casing and having at its inner side surface a shoulder, whereas the outer side surface of the casing is preferably provided with a projection for the recess to bear thereagainst during gas detonation, the bayonet joint being made up of mating projections and recesses provided at the inner surface of the casing adjacent the open end of the casing and at the side surface of the bottom.

The use of the jacket allows to simplify the drive for closing the bayonet joint, as there is no need for turning the casing or the bottom for their connection, and it is sufficient to rotate the jacket by a simple drive. The bottom and casing must be stationary. The arrangement of the bayonet joint without the jacket would have required the use of a complicated attachment of the casing to be capable of turning, or a complicated mechanism for turning the bottom.

Preferably, the seal between the casing and bottom is defined by an annular groove at the end of the bottom facing the casing, a mating annular projection at the end of the casing received by said groove to form an annular clearance at the side of the cavity of the gas detonation chamber, a sealing element secured in an annular recess at the bottom of said groove an engageable with the annular projection at the end of the casing and with liquid occupying the annular clearance.

Protection of the sealing element by a layer of liquid, such as water, makes it possible to prevent the damaging effect of the hot products of explosion on the sealing element, and increase the service life of the sealing element, which in this case can be fabricated from a soft elastic material, such as rubber, to reduce the force required for its compression.

Favourably, the jacket has a threaded ring screwed onto the inner side surface of the jacket surrounding the bottom, whereas the bayonet joint has mating projections and recesses made at the inner side surface of the threaded ring and at the side surface of the bottom.

The use of the threaded ring affords a higher reliability of the bayonet joint, since closing of the joint is done by turning of the threaded ring of relatively small mass. Therewith, the threaded ring bears in the jacket on several outer thread lines. In this manner contact pressure on the thread line during gas detonation is substantially reduced, lubrication of the thread is facilitated, and the surface of the thread lines becomes less susceptible to workhardening and scratching.

Preferably, the shoulder of the jacket is provided in proximity to the end of the casing opposite to its open end.

Provision of the jacket shoulder in proximity to the end of the gas detonation chamber opposite to its open end enables to relieve the side walls of the casing of the axial load due to pressure exerted on the bottom during gas detonation.

The force of pressure exerted on the bottom during gas detonation is exerted through the bayonet joint exclusively on the side walls of the jacket and is not taken up by the side walls of the casing, whereas the walls of the casing are acted upon by the gas detonation pressure to result only in radial deformations of the casing walls. The substantial length of the casing makes it possible to reduce its rigidity, which ensures an increase in the magnitude of its resilient deformation as the gas mixture explodes in the gas detonation chamber. In turn, this allows to reduce the pulse load exerted on the bayonet joint.

Advisably, the outer surface of the casing has a helical groove communicating with passages for feeding and discharging a colling liquid.

The helical groove cools the walls of the gas detonation chamber when using an additional jacket for colling.

Favourably, the angle of inclination of the bearing portion of the thread profile of the threaded ring and jacket to a plane perpendicular to the axis of the thread is less than the angle of inclination of the bearing portion of the groove profile of the bayonet joint to this plane.

By virtue of the fact that the angle of inclination of the bearing portion of the thread profile of the threaded ring and jacket to the plane perpendicular to the thread axis is less than the angle of inclination of the bearing portion of the profile of the grooves of the bayonet joint to the same plane, the action of pulse loads resulting from gas detonation, that is explosion of the gas mixture, exerted on the bottom and transmitted through the bottom to the threaded ring, causes the threaded ring to expand within the resiliency limits, whereby the bottom is lowered insignificantly. This affords to soften the pressure pulse resulting from the explosion of the explosive gas mixture imparted to the bottom thanks to the radial deformation of the threaded ring, which reduces the force of gas detonation exerted on the bayonet joint.

Preferably, the proposed apparatus is provided with a means for locking the bottom against turning as the bottom moves toward the casing, which includes a cup member embracing the bottom, open toward the casing and having ribs at its inner surface extending along the longitudinal axis of the cup member and intended to engage with the bottom, whereas the indexing table has ports for the cup members to be secured therein, the ends of the bottoms facing the casing being flush with the surface of the indexing table, the bottom of the cup member having a hole for the passage therethrough of a link of the drive for imparting reciprocations to the bottom.

Provision of the means for locking the bottom comprising the cup member with ribs at its outer surface allows to virtually eliminate inadvertent turning of the bottom as it moves to the casing and therefrom. When entering the cup member, each successive bottom invariably assumes the same present position, which facilitates the assembly of the bayonet joint, since clearances in the bayonet joint must be minimized to ensure that the joint is sufficiently strong.

The arrangement of the bottom flush with the surface of the indexing table affords to increase safety and convenience of operating the proposed apparatus for deburring workpieces by gas detonation thanks to the absence of projecting parts on the indexing table.

In view of the aforedescribed, the apparatus for deburring workpieces by gas detonation according to the invention features low mass and needs less metal to be consumed for its manufacture, since pulse loads resulting from gas detonation, i.e., from explosion in the gas detonation chamber, are closed inside this chamber and are not transmitted to the bed.

Another advantage is reduced comsumption of electric power by the hydraulic power drive for turning one of the elements of the bayonet joint to thereby require a very small force for closing the bayonet joint capable of withstanding detonation of the explosive mixture.

These and other advantages of the present invention will become more fully apparent from a more detailed description of a preferred embodiment thereof taken in conjunction with the accompanying drawings.

BEST MODE OF CARRYING OUT THE INVENTION

Figure 1:
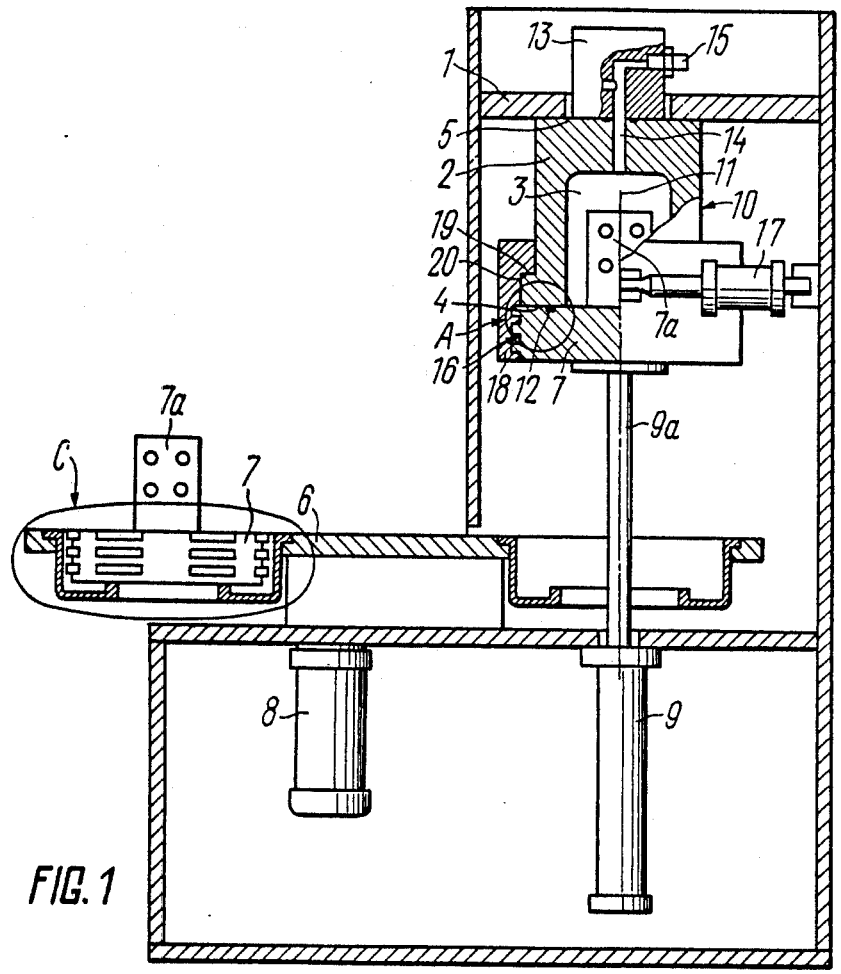
FIG. 1 is a partial sectional view of an apparatus for deburing workpieces by gas detonation according to the invention.

An apparatus for deburring workpieces by gas detonation according to the invention, hereinafter referred to as "the proposed apparatus", has a bed 1 (FIG. 1) with a casing 2 in the form of a cup secured to the top portion thereof. The casing 2 has a cavity 3 open at a lower end 4. The casing 2 is attached by its upper end 5 to the bed 1 by any known suitable means.

The proposed apparatus has an indexing table 6 secured on the bottom part of the bed 1. Arranged equidistantly about the circumference of the indexing table 6 are bottoms 7 intended to accommodate the workpieces to be deburred; in this case six such bottoms 7 are provided. The bottoms 7 are arranged alternately in front of the open end 4 of the casing 2. A drive 8 for turning the table 6 is provided in the form of an electric motor of any known suitable construction, a reduction gear, and a stepping means for turning the table 6 to a preset angle.

There is a drive 9 for lifting a successive bottom 7 toward the open end 4 of the casing 2 to form a gas detonation chamber 10 during their connection. The drive 9 is generally hydraulic power cylinder of any known suitable construction with a projectable rod 9a secured on the bed 1 below the table 6 about the vertical axis 11 of the casing 2.

A seal 12 is provided between the casing 2 and the bottom 7 engageable therewith.

The proposed apparatus forther comprises a system 13 for feeding gases to the chamber 10 to form an explosive mixture therein. The system 13 has a passage 14 provided in the casing 2 along the axis 11 and communicable with pipes (not shown) for feeding gases from gas sources (not shown).

Also, a spark plug 15 of any known suitable construction is provided for igniting the explosive mixture in the chamber 10. The spark plug 15 is arranged in a branch (not shown) of the passage 14 and is electrically connected to a source (not shown) of high voltage.

In the proposed apparatus the casing 2 and one of the bottoms 7 are interconnected by a bayonet joint 16 one element of which is kinematically linked with a drive 17 for turning it relative to the other element. The bayonet joint 16 includes projections and recesses arranged in three rows in terms of the height of the bottom 7. The drive 17 is a hydraulic power cylinder of any known suitable construction communicable with a source (not shown) of liquid pressure.

The hydraulic power cylinder of the drive 17 is connected by one end (not indicated by a reference numeral) to the bed 1 and by the other end at the side of its rod (not indicated by a reference numeral) to one of the elements of the bayonet joint 16. The longitudinal axis (not indicated) of the hydraulic power cylinder of the drive 17 is disposed perpendicularly to the longitudinal axis 11 of the casing 2.

The casing 2 has a jacket 18 surrounding part of the outer side surface of the casing 2 extending after the open end 4 of the casing 2 and having the form of a cylinder. The jacket 18 has a shoulder 19 in the form of a horizontal annular band at its inner side surface. Provided at the outer side surface of the casing is a mating projection 20 for the shoulder 19 of the jacket 18 of bear against this projection 20 during gas detonation, that is during explosion.

Figure 2:
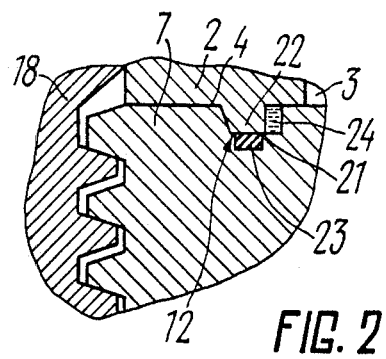
FIG. 2 is an enlarged view of location A in FIG. 1.

The bayonet joint 16 includes mating projections and recesses (not indicated by reference numerals) extending about a helical line on the inner surface of the jecket 18 close to the open end 4 of the casing 2 and on the side surface of the bottom 7, as shown in FIG. 2. The drive 17 (FIG. 1) in this case is connected by its rod with the jacket 18 for the jacket 18 to be turned relative to the bottom 7.

The jacket 18 is intended to simplify closing of the bayonet joint 16, since such a closing is accompanied by that the drive 17 turns only the jacket 18. The bottom 7 is locked against turning relative to the casing 2 by any known suitable means. An alternative arrangement of the bayonet joint without the jacket 18 would have required that the casing 2 be secured so as to be capable of turning, which would complicate construction of the casing 2, or would require the use of a complicated arrangement for turning the bottom 7.

The seal 12 between the casing 2 and bottom 7 is defined by an annular groove 21 (FIG. 2) at the upper end (not indicated) of the bottom 7 facing the casing 2 and a mating annular projection 22 at the end 4 of the casing 2 received by said groove 21. Arranged at the bottom of the annular groove 21 in an annular recess (not indicated) is an annular sealing element 23 fabricated from any known elastic material suitable for the purpose.

The annular groove 21 of the bottom 7 and the annular projection 22 of the casing 2 define an annular clearance 24 between the sealing element 23 and cavity 3. The annular clearance 24 is intended to be filled with a liquid, in this case water, to protect the sealing element 23 from the action of gas detonation.

Figure 3:
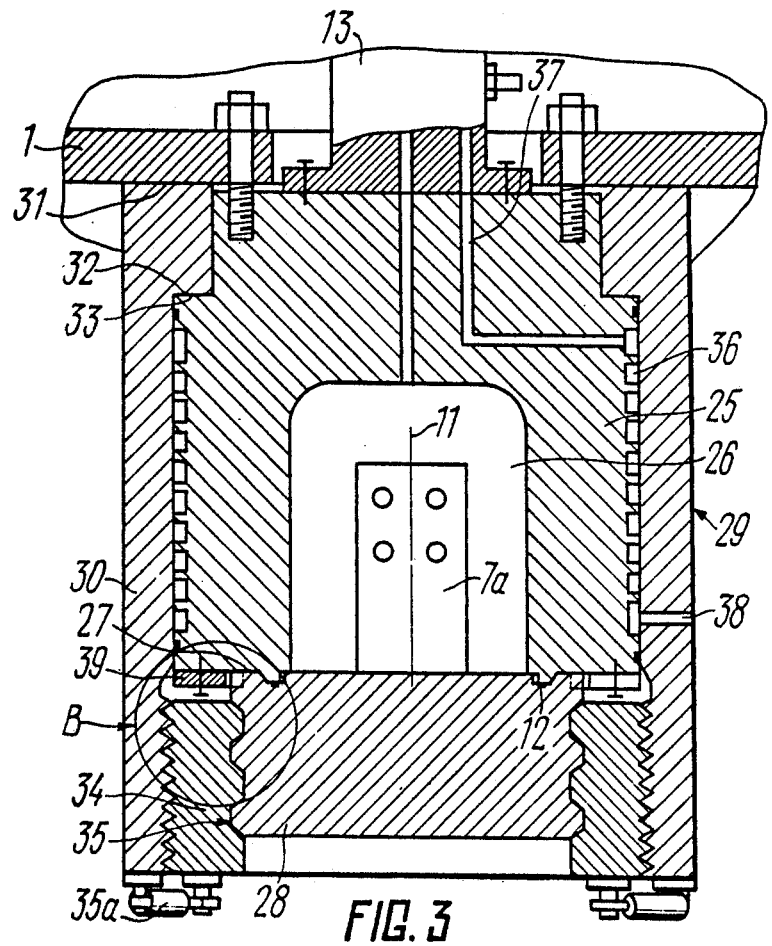
FIG. 3 is a longitudinal sectional enlarged view of a gas detonation chamber in which the jacket has a threaded ring of the apparatus according to the invention.

With reference to the embodiment of the present invention shown in FIG. 3, secured on the bed 1 is a casing 25 having a cavity 26 open at a lower end 27. The casing 25 is secured by its upper end (not indicated) to the bed 1 by any known suitable means (not indicated) not described herein since it has no direct bearing on the essence of the invention.

This modified form of the apparatus is also provided with replaceable bottoms 28 arranged alternately in front of the open end 27 of the casing 25 substantially as shown in the previously described modification and lifted likewise to the lower end 27 of the casing 25 to form a gas detonation chamber 29 as they are brought together.

A seal 12 is further provided between the casing 25 and bottom 28.

The casing 25 has a jacket 30 in the form of a cylinder to completely embrace the outer side surface of the casing 25.

An upper end 31 of the jacket 30 bears on the bed 1. The jacket 30 has a shoulder 32 on its inner side surface having the form of a horizontal annular band. The shoulder 32 is arranged in the top part of the jacket 30.

The outer side surface of the casing 25 has a mating projection 33 for the shoulder 32 of the jacket 30 to bear thereagainst during gas detonation. Such an arrangement of the shoulder 32 makes it possible to relieve the side walls of the casing 25 of the chamber 29 from the axial load exerted thereon during gas detonation and reduce the pulse load exerted on the bayonet joint.

The jacket 30 has a threaded ring 34 screwed onto the inner lower side surface of the jacket 30 surrounding the bottom 28. The bayonet joint 35 includes mating projections and recesses (not indicated) spaced about the circumference at the inner side surface of the threaded ring 34 with mating recesses and projections (not indicated by reference numerals) at the side surface of the successive bottom 28.

The provision of the threaded ring 34 allows to increase the reliability of closing the bayonet joint 35.

The threaded ring 34 is kinematically linked with a drive 35a to turn it relative to the bottom 28. The drive 35a has the form of two hydraulic power cylinders connected to a source (not shown) of liquid pressure. The hydraulic cylinders of the drive 35a are diametrically opposed and pivotably secured by ends (not indicated) thereof by any known suitable means to the lower end of the jacket 30, and by the other ends at the side of their rods (not indicated) are secured to the lower end of the threaded ring 34. The longitudinal axis of the hydraulic power cylinders of the drive 35a is in a plane perpendicular to the vertical axis 11 of the casing 25.

The outer cylindrical surface of the casing 25 has a helical groove 36 communicating with a passage 37 for feeding a cooling liquid from a source (not shown) and a passage 38 for discharging the cooling liquid to a drainage means (not shown), this groove 36 serving to cool the walls of the casing 25.

Figure 4:
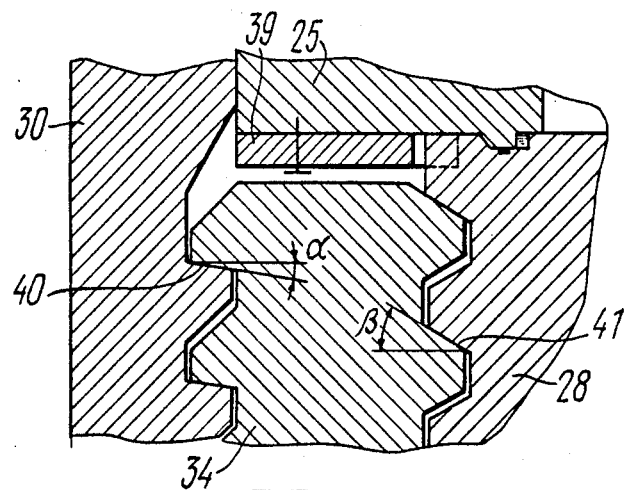
FIG. 4 is an enlarged view of location B in FIG. 3.

The lower end 27 of the casing 25 has a locking ring 39 (FIGS. 3 and 4) serving to prevent the bottom 28 against turning relative to the casing 25 when closing the bayonet joint 35. This locking ring 39 is secured at the lower end 27 of the casing 25 by any known suitable means. The locking ring 39 (FIG. 4) has radial projections (shown by dotted lines and not indicated by a reference numeral) entering mating recesses (not shown) of the bottom 28.

The angle $\alpha$ (FIG. 4) of inclination of a bearing portion 40 of the thread profile of the threaded ring 34 and jacket 30 to the plane perpendicular to the axis of the thread is less than the angle $\beta$ of inclination of a bearing portion 41 of the profile of the grooves of the bayonet joint 35 to this plane.

With such a combination of the angles $\alpha$ and $\beta$ part of the pulsed load exerted on the bottom 28 during gas detonation is redistributed causing expansion of the threaded ring 34, whereas the bottom 28 moves downwards from the lower end 27 of the casing 25. In this manner the pulsed load resulting from gas detonation and excerted on the bottom 28 is softened more smoothly reducing the force taken up by the bayonet joint.

Provided in the indexing table 6 (FIG. 1) and spaced equidistantly around the circumference are six ports 42 (FIG. 5) to accomodate six replaceable bottoms 7.

Means 43 are provided equal in number to the number of bottoms 7 for locking these bottoms 7 against turning as the bottom 7 moves toward the casing 2.

Figure 5:
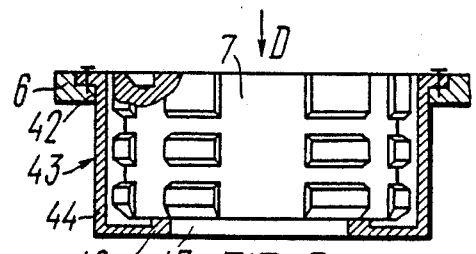
FIG. 5 is an enlarged view of location C in FIG. 1.
Figure 6:
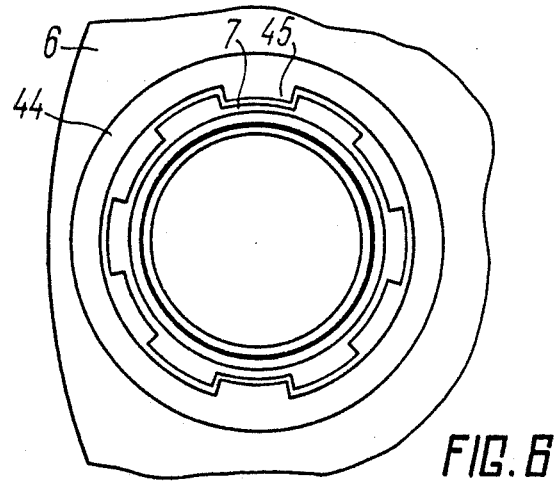
FIG. 6 is a view along the arrow D in FIG. 5.

Each means 43 comprises a cup member 44 embracing the bottom 7, open toward the casing 2, and having several ribs 45 (FIG. 6) at its inner surface. The ribs 45 are integral with the cup member 44, extend along the longitudinal vertical axis (not indicated) of the cup member 44, and engage with the recesses of the bottom 7 forming the bayonet joint 35, thus virtually completely preventing small inadvertent turning of the bottom 7 as it moves toward the casing 2 (FIG. 1), whereby the reliability of the bayonet joint 16 is improved. The upper ends of the bottoms 7 facing the casing 2 are made flush with the surface of the indexing table 6, as shown in FIGS. 1 and 5, which makes the apparatus more safe and convenient in servicing.

Referring again to FIG. 5, the bottom 46 of each cup member 44 has a hole 47 to ensure the passage therethrough of a link, viz., rod 9a of the reciprocating drive 9 of the bottom 7.

The apparatus according to the invention represented in FIGS. 1 and 2 operates in the following manner.

Workpieces 7a to be deburred are placed on the upper surface of the bottom 8 disposed on the indexing table 6. The drive 8 acts to turn the indexing table 6 so that the bottom 7 with workpieces 7a to be deburred would be under the casing 2 in line with the axis 11.

The annular groove 21 with the sealing element 23 is then filled with water.

The rod 9a of the hydraulic power cylinder 9 projects to thrust against the bottom 7 and lift the bottom 7 with workpieces 7a to the lower end 4 of the casing 2. The workpieces 7a placed on the bottom 7 thereby rest inside the cavity 3 of the casing 2. The annular projection 22 at the lower end 4 of the casing 2 enters the annular groove 21 of the bottom 7 to compress the sealing element 23 received in the annular groove 21. Therewith, water present in the annular groove 21 of the bottom 7 is forced to occupy the annular clearance 24 between the sealing element 23 and cavity 3 of the casing 2.

Thereafter, the rod (not indicated by a reference numeral) of the hydraulic power cylinder of the drive 17 is retracted to turn one of the elements of the bayonet joint 16, in this instance jacket 18. The jacket 18 turns to bear by its projection 19 on the surface of the shoulder 20 of the casing 2. As the jacket 18 turns, its projections and recesses engage with the mating projection and recesses of the bottom 7. Because all the projections and recesses extend about a helical line, then during turning of the jacket 18 the bottom 17 is forced by the bayonet joint 16 to the lower end 4 of the casing 2. In this manner the cavity 3 of the casing 2 is hermetically closed to form the chamber 10.

By way of valves (not shown) of the system 13 for feeding gases from gas cylinders (not shown) the chamber 10 is fed along the passage 14 of the casing 2 with combustible gas and oxygen to form an explosive gas mixture in the cavity 3 of the chamber 10 around the workpieces 7a to be deburred.

Pressure and ratio between components of the explosive gas mixture in the cavity 3 of the chamber 10 depend on the material of the workpieces 7a to be deburred and the size of burrs thereon. After an explosive gas mixture of desired composition and pressure has been formed in the cavity 3 of the chamber 10, the valves of the gas feeding system 13 are closed to cut off the passage 14 of the casing 2 from the gas cylinders.

A high voltage electric pulse is then applied to the spark plug 15. A spark jumps across the points of the plug to ignite the explosive gas mixture in the cavity 3 of the chamber 10 and cause an explosion, which lasts for about 20 milliseconds. The temperature of the detonation wave reaches 3000° C., and the pressure of products of detonation in the chamber 10 becomes dozens of times higher than the initial pressure of the explosive gas mixture. Hot gases fail to affect in any way the seal 23, because this seal 23 rests under a layer of water in the clearance 24.

The detonation wave flows about all the surface present in the chamber 10, whereby burrs tend to be heated and burn thanks to their negligeable mass and relatively large surface area. Burrs in such inconvenient locations as points of intersection of deep holes are removed as easily as those at the outer surfaces.

A pressure pulse resulting from the gas detonation acts on all the surfaces present in the chamber 10, including the walls of the workpieces 7a being deburred. Therefore, walls of the workpieces 7a must be sufficiently rigid and strong, or they must be reliably protected by special shields (not shown) not to be subjected to deformation.

A pressure pulse resulting from the explosion and acting on the side walls of the cavity 3 of the casing 2 is taken up by the side walls of the casing 2 causing radial deformation. On the other hand, a pressure pulse of gas detonation acting on the upper end 5 of the casing 2 and on the bottom 7 tends to open the chamber 10, is taken up by the bayonet joint 16, and is imparted to the jacket 18 to stretch it. Then the pulse is transferred through the recess 19 of the jacket 18 and shoulder 20 of the housing 2 to the side walls of the casing 2.

In view of the foregoing, the pressure pulse acting during gas detonation on the chamber 10 is locked through the bayonet joint 16 inside the chamber 10 per se, and therefore fails to be transmitted to the bed 1. In turn, this affords to make use of a bed of low mass and strength.

For deburring workpieces 7a of larger size it is not necessary to increase the strength of the bed. It is sufficient to enlarge the cavity 3 of the casing 2 and ensure the strength of the walls of the casing 2 and bayonet joint 16.

If necessary, after the gas detonation the products of detonation are discharged from the cavity 3 of the chamber 10 to the atmosphere via a special valve (not shown) in the gas feeding system 13 along the passage 14. After the pressure in the cavity 3 of the chamber 10 is brought closer to the atmospheric, the rod of the hydraulic power cylinder of the drive 17 projects to turn the jacket 18. The bayonet joint 16 is brought out of engagement and releases the bottom 7.

The rod of the hydraulic power cylinder of the drive 3 is then retracted to lower the bottom 7 with the deburred workpieces onto the indexing table 6. When being lowered, the bottom 7 engages with the ribs 45 of the cup member 44, and is fitted in the cup 44 of the table 6 invariably in the same position. In this manner inadvertent turning of the bottom 7 about its axis during lifting and lowering is virtually avoided, which facilitates each successive assembly of the bayonet joint.

Then follows a next turning of the table 6. A successive bottom 7 with a new batch of workpieces 7a to be deburred is brought to the position under the casing 2 in line with the axis 11. The deburred workpieces are removed from the preceding bottom 7, and the cycle is repeated.

In the case of arrangement of detonation chamber as shown in FIG. 3 the proposed apparatus operates as follows. Prior to closing of the bayonet joint 35 the apparatus functions in a similar manner. After the bottom 28 carrying workpieces 7a has been lifted to the lower end 27 of the casing 25, the radial projections of the ring 39 are received by the respective recesses of the bottom 28 to lock the bottom 28 against turning as the bayonet joint 35 is closed.

After this the rods of the hydraulic power cylinders of the drive 35a for turning the threaded ring 34 are drawn-in to turn this threaded ring 34. The projections and recesses of the bayonet joint 35 of the ring 34 are brought into engagement with the mating projections and recesses of the bottom 28. Since the ring 34 turns about its outer threads, it is caused to be raised during turning and force the bottom 28 by the bayonet joint 35 to the lower end 27 of the casing 25, whereby the cavity 26 of the casing 25 becomes hermetically and reliably sealed to form the chamber 29.

The feeding of combustible gas and oxygen accompanied by the formation of an explosive mixture and ignition thereof take place substantially in a manner similar to what heretofore been described.

During gas detonation, that is during explosion taking place in the chamber 29 burrs are removed from the workpieces. A pressure pulse caused by the gas detonation and acting on the side walls of the cavity 26 of the casing 25 is taken up by the walls of the casing 25 to result in radial deformation thereof. Conversely, a pressure pulse resulting from the gas detonation and acting on the upper end of the casing 25 and bottom 28 is directed to open the chamber 29, and is taken up by the bayonet joint 35 to be transmitted through its bearing portion 41 of the profile of the grooves inclined at an angle $\beta$ to the threaded ring 34. Then the pulse is transmitted to the casing 30 through the bearing portion 40 of the profile of the outer thread of the ring 34 inclined at an angle $\alpha$. Due to that the angle $\alpha$ is less than the angle $\beta$, the threaded ring 34 expands within the limits of resilient deformation, whereas the bottom 28 is lowered to an extent proportional to the angle $\beta$ thereby softening the action of pressure pulse.

The pulse exerted on the casing 30 is transmitted through the shoulder 32 to the projection 33 of the casing 25 at the top of the casing 25. The casing 30 is also caused to stretch to within the limits of resilient deformation, thereby still further softening the action of pressure pulse on the bottom 28.

In view of the aforedescribed, the load produced by the gas detonation is confined inside the chamber 29. Therewith, the loads are taken up separately, viz., the radial loads are taken up by the side walls of the casing 25 causing radial deformation therein, whereas the axial loads are taken up through the bayonet joint 35 and threaded ring 34 by the casing 30 causing longitudinal deformation and by the threaded ring 34 causing radial deformation. Axial loads ecerted on the walls of the casing 25 fail to be transmitted. This is especially important when increasing the volume of the cavity 26. As a result, the chamber 29 functions reliably.

Because gas detonation is accompanied by liberation of substantial amounts of heat absorbed by the walls of the casing 25, these walls are caused to be cooled by water delivered from the water source along the passage 37 and further along the helical groove 36 washing the outer wall of the casing 25. The heated water is discharged through the passage 38.

Thereafter, this modification of the proposed apparatus operates in a manner similar to what has been described with reference to the previously described embodiment.

Several pilot models of the proposed apparatus for deburring workpieces by gas detonation have been fabricated. The weight of each such apparatus was below 3.5 t. Tests have evidenced high reliability of the apparatus and high deburring capacity thanks to the automatic mode of operation.

INDUSTRIAL APPLICABILITY

This invention can be used most effectively for removing burrs from workpieces in hard-to-reach locations, such as at points of intersection of deep holes of casings of distribution hydropneumatic panels.

The proposed apparatus for deburring workpieces by gas detonation can also be used for removing burrs appearing on workpieces after machining, and for removing thin flash formed on workpieces during stamping, pressure moulding, and compacting.

The walls of such workpieces must have such thickness and shape as to avoid residual deformation during gas detonation.

We claim:

1. An apparatus for deburring workpieces by gas detonation comprising a bed (1) having mounted thereon a casing (2) with a cavity (3) open at one end (4) of the casing (2), an indexing table (6) with bottoms (7) arranged alternately opposite to the open end (4) of the casing (2), a drive (9) for reciprocating the successive bottom (7) toward the open end (4) of the casing (2) to form during their connection a gas detonation chamber (10), a seal (12) between the casing (2) and bottom (7), and a system (13) for feeding gases to the gas detonation chamber (10) to form an explosive mixture with a spark plug (15) to ignite the explosive mixture, characterized in that the casing (2) is connected to the bottom (7) by a bayonet joint (16), one element of which is kinematically linked with a drive (17) to turn it relative to the other element thereof.

2. An apparatus as claimed in claim 1, characterized in that the casing (2) is provided with a jacket (18) surrounding at least part of the outer side surface of the casing (2) extending beyond the open end (4) of the casing (2) and having at its inner side surface a shoulder (19), whereas the outer side surface of the casing (2) is provided with a projection (20) for the shoulder (19) to bear thereagainst during gas detonation, the bayonet joint (16) being made up of mating projections and recesses provided at the inner surface of the casing (18) adjacent to the open end (4) of the casing (2) and at the side surface of the bottom (7).

3. An apparatus as claimed in claim 1, characterized in that the seal (12) between the casing (2) and bottom (7) is defined by an annular groove (21) at the end of the bottom (7) facing the casing (2), a mating annular projection (22) at the end (4) of the casing (2) received by said groove (21) to form an annular clearance (24) at the side of the cavity (3) of the gas detonation chamber (10), a sealing element (23) secured in an annular recess at the bottom of said groove (21) and contacting with the annular projection (22) at the end (4) of the casing (2), and with liquid occupying said annular clearance (24).

4. An apparatus as claimed in claim 2, characterized in that a jacket (30) has a threaded ring (34) screwed onto the inner side surface of the jacket (30) surrounding a bottom (28), whereas a bayonet joint (35) is made up of mating projections and recesses provided at the inner side surface of the threaded ring (34) and at the side surface of the bottom (28).

5. An apparatus as claimed in claim 4, characterized in that a shoulder (32) of the jacket (30) is provided in proximity to an end (31) of the casing (25) opposite to its open end (27).

6. An apparatus as claimed in claim 5, characterized in that the outer surface of the casing (25) has a helical groove (36) communicating with passages (37, 38) for feeding and discharging a cooling liquid.

7. An apparatus as claimed in claim 4, characterized in that the angle ($\alpha$) of inclination of a bearing portion (40) of the thread profile of the threaded ring (34) and jacket (30) to a plane perpendicular to the axis of the thread is less than the angle ($\beta$) of inclination of a bearing portion (41) of the groove profile of the bayonet joint (35) to this plane.

8. An apparatus as claimed in claim 1, characterized in that it is provided with a means (43) for locking the bottom (7) against turning as this bottom (7) move toward the casing (2), which includes a cup member (44) embracing the bottom (7) open toward the casing (2) and having ribs (45) at its inner surface extending along the longitudinal axis of the cup member (44) and intended to engage with the bottom (7), whereas the indexing table (6) has ports (42) for the cup members (44) to be secured therein, the ends of the bottoms (7) facing the casing (2) being flush with the surface of the indexing table (6), the bottom (46) of the cup member (44) having a hole (47) for the passage therethrough of a link (9a) of the drive (9) for imparting reciprocations to the bottom (7).

* * * * *